Dec. 23, 1924.

1,520,424

C. McCULLOUGH

MACHINE FOR TREATING EGGS

Filed Dec. 6, 1923   5 Sheets-Sheet 3

FIG.3.

INVENTOR
CHARLES McCULLOUGH.
or White Prest Evans
HIS ATTORNEYS

Dec. 23, 1924. 1,520,424
C. McCULLOUGH
MACHINE FOR TREATING EGGS
Filed Dec. 6, 1923 5 Sheets-Sheet 4

INVENTOR.
CHARLES McCULLOUGH
HIS ATTORNEYS

Dec. 23, 1924.

C. McCULLOUGH 1,520,424

MACHINE FOR TREATING EGGS

Filed Dec. 6, 1923    5 Sheets-Sheet 5

INVENTOR
CHARLES McCULLOUGH
BY White *** Evans
HIS ATTORNEYS.

Patented Dec. 23, 1924.

1,520,424

UNITED STATES PATENT OFFICE.

CHARLES McCULLOUGH, OF BERKELEY, CALIFORNIA, ASSIGNOR TO CLARA SEARS McCULLOUGH, OF BERKELEY, CALIFORNIA.

MACHINE FOR TREATING EGGS.

Application filed December 6, 1923. Serial No. 678,842.

*To all whom it may concern:*

Be it known that I, CHARLES McCULLOUGH, a citizen of the United States, and a resident of the city of Berkeley, county of Alameda, State of California, have invented a certain new and useful Machine for Treating Eggs, of which the following is a specification.

The invention relates to a machine for treating eggs so that the eggs will keep fresh for long periods of time.

An object of the invention is to provide a machine which will successively wash, dry and process the eggs.

Another object of the invention is to provide a machine into which dirty, untreated eggs may be introduced and from which clean, processed eggs are discharged.

A further object of the invention is to provide means for thoroughly drying the eggs after they have been washed and before they are introduced into the hot processing liquid.

Another object of the invention is to provide an improved method of processing the eggs.

The invention possesses other advantageous features, some of which, with the foregoing, will be set forth at length in the following description, where I shall outline in full, that form of my invention which I have selected for illustration in the drawings accompanying and forming part of the present specification.

In said drawings I have shown one form of machine embodying my invention, but it is to be understood that I do not limit myself to such form, since the invention, as set forth in the claims, may be embodied in a plurality of forms.

Referring to said drawings:—

The machine of my invention is arranged to receive dirty fresh eggs and to convey the eggs successively through a washing apparatus, a drying apparatus, and a processing apparatus. In the washing apparatus the eggs are subjected to the action of brushes which cause the eggs to roll so that they are thoroughly cleaned at all parts. From the washing apparatus the eggs are conveyed over brushes which wipe the collected water from the bottoms of the eggs and are then conveyed through a tunnel, through which a current of heated air is passed, for the purpose of thoroughly drying the eggs. The dry eggs are then carried into a warm atmosphere for the purpose of raising their temperature and are then submerged in a hot processing liquid. Upon emerging from the liquid the eggs pass into a warm atmosphere and are then submerged in a cold processing liquid so that the eggs are cooled while they are submerged in the liquid. After they have been cooled the eggs are conveyed from the cooling liquid and drained and are ready for repacking. The machine is preferably constructed so that the eggs are fed into and discharged from the machine at the same end, thereby reducing the number of persons necessary to operate the machine and concentrating the eggs at one end of the machine, so that the boxes from which the dirty eggs were removed, may be used, without transportation, to receive the clean, processed eggs.

The machine of my invention comprises a suitable frame 2 on which the various instrumentalities forming part of the machine are mounted. The frame is preferably formed of steel shapes suitably arranged and suitably held together to serve as a support for the various parts of the operating apparatus. Arranged on the upper part of the frame adjacent its forward end, is a tank 4 adapted to contain water or other washing liquid. This tank contains a large volume of washing liquid and means are provided for heating this liquid to facilitate the washing of the eggs. In the drawings I have shown two means of heating the liquid, one comprising burners 5 arranged below the tank within the chamber 6 and the other comprising a circulating heater 7 which receives water from the bottom of the tank through the pipe 8 and discharges the heated liquid into the upper portion of the tank through the pipe 9.

Figure 6:
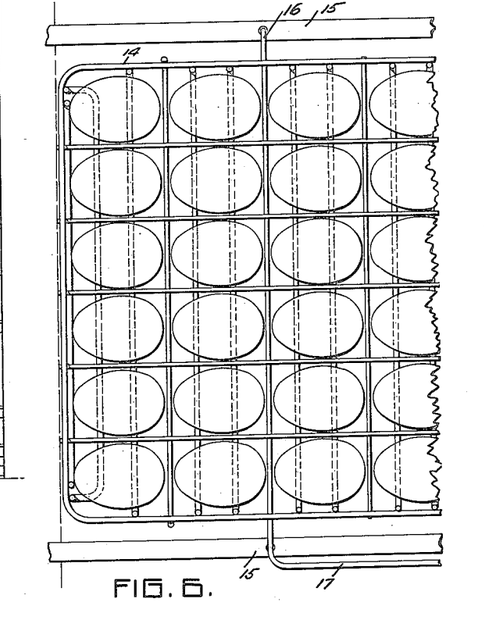
Figure 6 is a top, or plan view of a portion of an egg carrying tray showing the eggs arranged therein.
Figure 7:
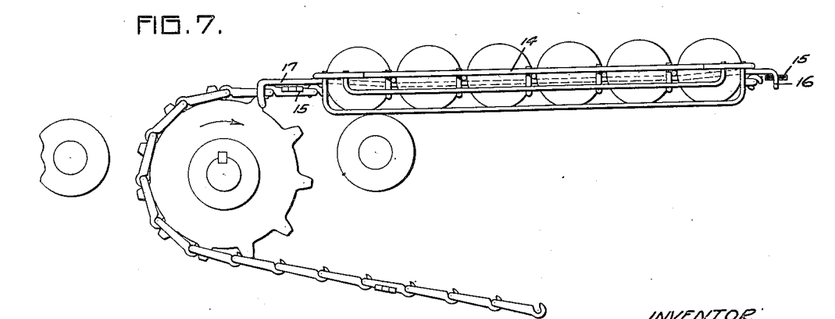
Figure 7 is a side view of a tray mounted on the conveyor.

Means are provided for carrying the eggs to be washed through the tank and for scrubbing or brushing them during their passage through the tank. Mounted on the frame 2 is an endless conveyor 12 on which the eggs are carried through the tank. The conveyor is carried on and around suitable rollers mounted on the frame and is driven by any suitable means, such as the motor 13 mounted on the frame. The eggs are arranged in trays 14 with the longer axes of the eggs extending transversely of the trays and the trays are carried by the conveyor through the tank 4. The conveyor 12 is provided with cross members 15 which are engaged by the tray. At its front end the tray is preferably provided with a plurality of hooks 16 which extend through apertures in the cross members 15, for removably holding the tray in position on the conveyor and is provided at its rear end with a hook extension 17 which extends beyond the successive cross member 15 to support the rear end of the tray, the tray is thus suspended between the two chains of the conveyor and the tray is formed of wire or otherwise made perforate so that the washing means may have full access to the eggs, for the purpose of removing the dirt therefrom. By arranging the eggs in the tray with their longer axes at right angles to the direction of travel of the conveyor, the eggs may be readily rotated so that all parts of the surface thereof are subjected to the washing and scrubbing means.

The conveyor 12 passes over the end sprocket 21 and then under the sprockets 22 and 23 which hold the conveyor submerged in the liquid in the tank 4. The eggs which are carried by the conveyor are therefore submerged or partially submerged in the washing liquid.

Means are arranged in the washing tank for scrubbing and rotating the eggs about the longer axes to thoroughly clean the eggs. Supported on the frame 2 and disposed above the tank 4 is a trackway 24 on which is mounted, by means of the rollers 25, the upper brush 26. This brush lies above the conveyor and is effective upon the upper surfaces of the eggs. Disposed in the tank adjacent the bottom thereof is a trackway 27 upon which the lower brush 28 is mounted. The lower brush is longer than the upper brush and is disposed below the conveyor so that it acts on the under surfaces of the eggs. The lower brush also serves as a cushion to slightly raise the eggs from the tray, so that they are readily rotated by the action of the brushes. Means are provided for oppositely reciprocating the brushes so that both brushes act at the same time to rotate the egg in one direction. The extent of reciprocation of the lower brush is less than the reciprocation of the upper brush so that the action of the brushes not only causes oscillation of the eggs, but causes a gradual rotary movement of the eggs, in a step by step movement so that all parts of the eggs are subjected to the brushing action.

Figure 5:
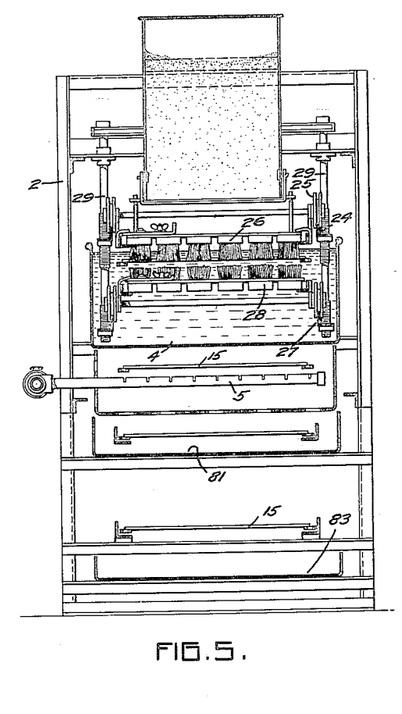
Figure 5 is a cross section of the machine taken on the line 5—5 Figure 3.

Means are provided for adjusting the position of the brushes with respect to the conveyor for operating on eggs of different size. The trackways 24 and 27 are supported on the vertically disposed threaded spindles 29, the threads cooperating with the upper track being opposite to the threads co-operating with the lower track so that as the spindles 29 are rotated the tracks are moved apart or together vertically. The spindles 29 are provided with sprockets 31 which are engaged by the chain 32, so that rotation of the crank 33 serves to rotate all of the spindles 29 simultaneously and thus vary the vertical spacing of the brushes. The upper and lower brushes 26 and 28 are oppositely reciprocated in different degrees. The upper brush 26 is connected by means of the links 34 and 35 with the crank arm 36 which is rotated by the motor. The lower brush 28 is connected by the links 37 and 38 with the crank arm 39, which is of less length than the crank arm 36 and which is secured to the same shaft as the crank arm 36. The extent of reciprocation of the lower brush is therefore less than the extent of reciprocation of the upper brush. The links 34 and 35 are supported at their point of connection by the swinging link 42 and the links 37 and 38 are similarly supported at their connection by the swinging links 43. By the use of these supporting links, longitudinal movement only is imparted to the brushes so that their spacing cannot be influenced by the varying angularity of the connecting links 35 and 38.

It sometimes happens that the eggs are so dirty that they are not properly cleaned by the action of the brushes and the cleaning liquid and to meet this contingency I have provided means for applying a finely divided abrasive material, such as sand, to the eggs, to assist in removing the dirt therefrom. Disposed above the brushes and supported on the frame is a hopper 45 for the abrasive material having a discharge spout 46 which is controlled by the swinging gate 47. The gate is connected to the holder for the top brush 26 by the rod 48, so that movement of the top brush causes the spout to be intermittently opened to permit the sand to discharge onto the top brushes. The backs of the brushes are perforated and the sand sifts down through the backs into spaces between the bristles and is brought into contact with the eggs. The action of the sand and the brushes and the washing liquid thoroughly cleanses the eggs. In some instances the eggs may only be slightly dirty and in such case the liquid may be drained from the tank and the eggs subjected only to the action of the brushes and the abrasive material so that the eggs are not wet. This eliminates the necessity of subsequently drying the eggs. The brushes are removably held in the brush holders so that they may be removed for the purpose of repair or replacement.

From the washing tank 4, the conveyor passes into and through the tunnel 51 through which heated air is blown. Arranged in the bottom of the tunnel, below the conveyor, is a series of brushes 52 which contact with the lower surfaces of the eggs, as the eggs pass over the brushes. The major portion of the liquid on the eggs collects in drops on the under surfaces of the eggs and these brushes 52 serve to wipe these drops from the eggs.

The heated air is blown through the tunnel in the opposite direction to the direction of travel of the eggs so that the eggs are thoroughly dried before they reach the end of the tunnel. Adjacent the conveyor exit end, the tunnel is provided with a hot air jacket 53 which is closed at its outer end and open at its inner end so that the hot air introduced into the jacket is discharged into the tunnel in a direction opposite to the direction of the travel of the conveyor and passes through the tunnel in such direction. The air is heated in any suitable form of heater 54 and is blown into the jacket 53 by the blower 55 driven by the motor 56. The conveyor 12 emerges from the tunnel at the far end thereof, passes over the driving sprocket 57 and returns to the front end of the machine under the tunnel and the washing tank.

Figure 1:
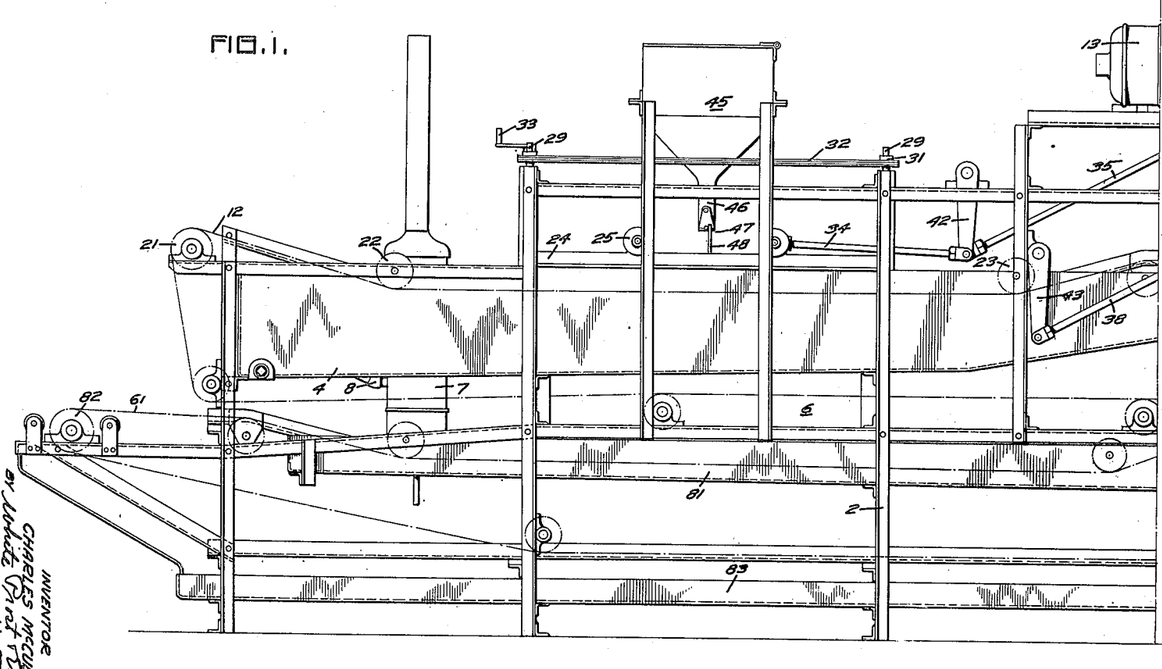
Figure 1 is a side elevation of the front half of a machine embodying my invention.
Figure 2:
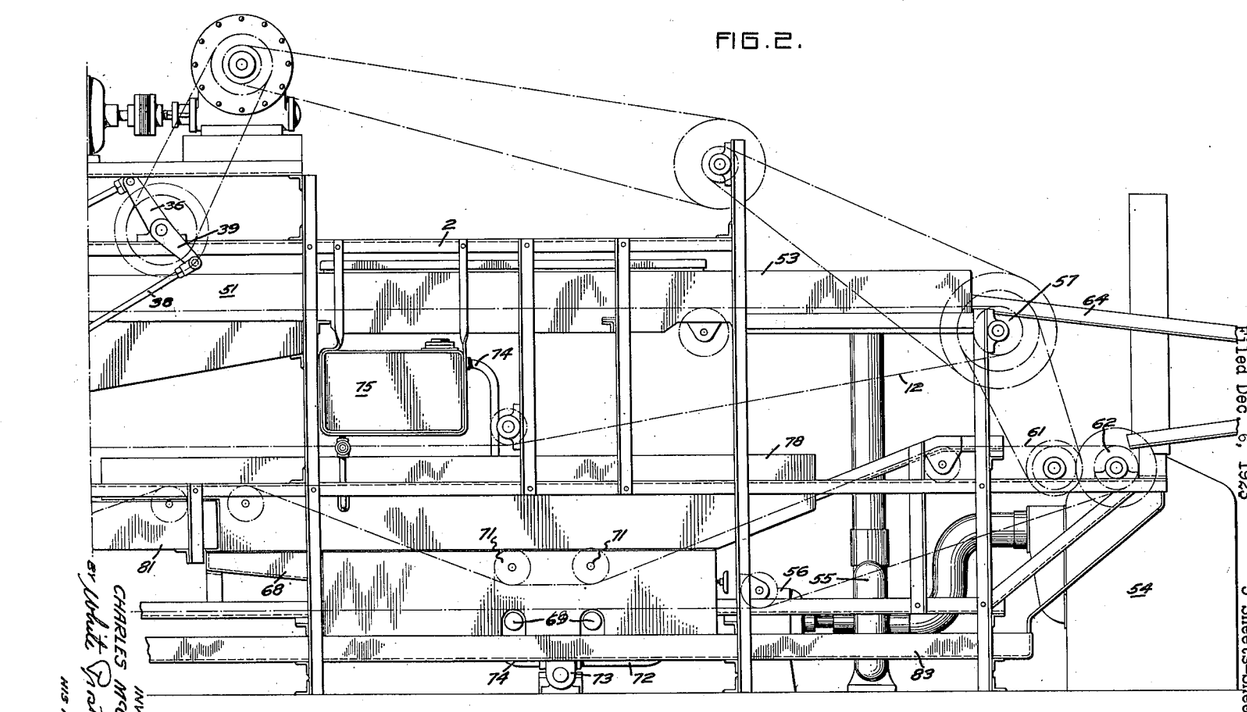
Figure 2 is a continuation of Figure 1 and comprises a side elevation of the rear half of the machine, a portion thereof being broken away to reduce the size of the figure.
Figure 3:
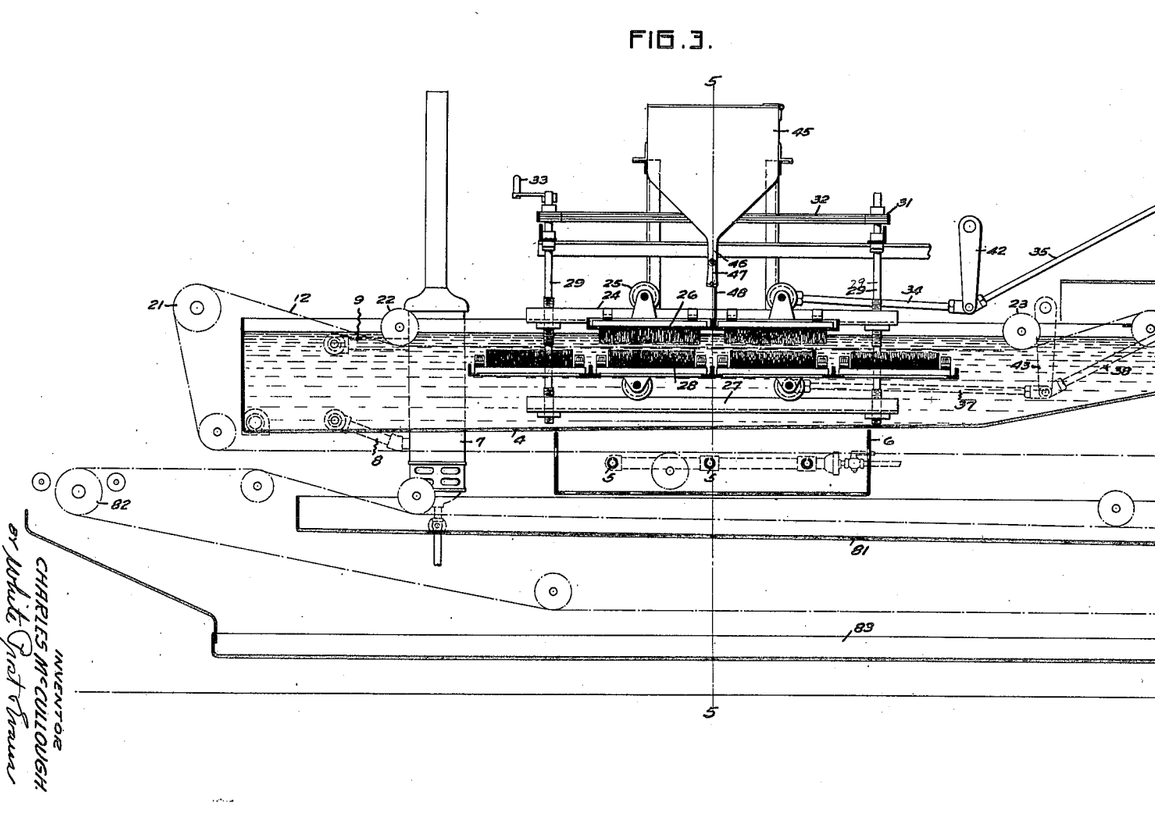
Figure 3 is a longitudinal vertical section, partly diagrammatic, through the front half of the machine of my invention.
Figures 4, 8:
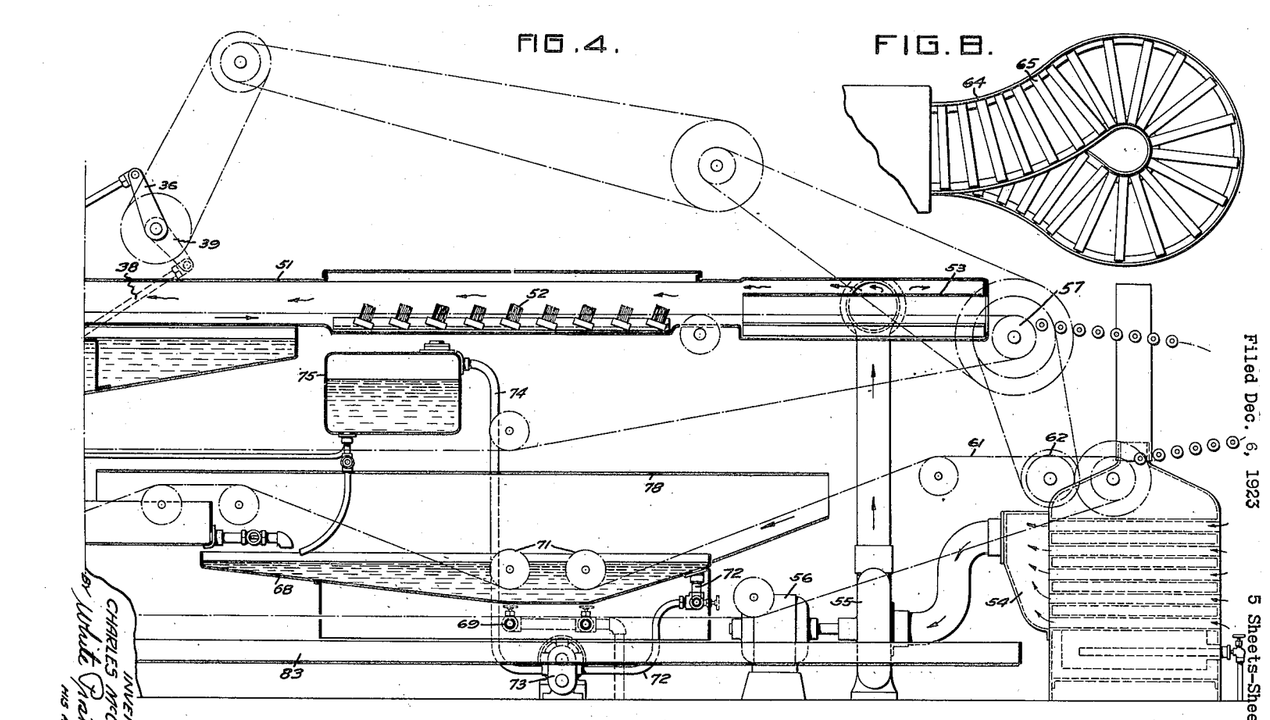
Figure 4 is a continuation of Figure 3 and comprises a vertical longitudinal section through the rear half of the machine.
Figure 8 is a plan or top view of the conveyor for transferring the egg trays from the upper conveyor to the lower conveyor.

Mounted on the frame below the washing and drying apparatus is a processing apparatus which includes an endless conveyor 61, driven by the driving sprocket 62, for conveying the egg trays through the tank containing the heated processing liquid. The receiving end of the conveyor 61 is arranged below the discharge end of the conveyor 12 and means are provided for transporting the trays from the conveyor 12 to the conveyor 61. As the conveyor 12 passes over the sprocket 57, the tray 14 is disengaged from the conveyor 12 and discharged onto the roller conveyor 64 over which the tray passes by gravity to the receiving end of the conveyor 61. The conveyor 64 comprises a plurality of freely rotatable rollers 65 arranged in such manner that the tray is turned through an angle of 180° before it is discharged onto the conveyor 61. The conveyor 61 is constructed similarly to the conveyor 12 and the hooked members 16 and 17 of the tray engage the cross members 15 of the conveyor 61 so that the tray is moved with the conveyor. The upper run of the conveyor 61 travels in the opposite direction to the upper run of the conveyor 12 and operates to carry the eggs from the far end of the machine, through the processing apparatus and deliver them at the near or charging end of the machine. The eggs are thus fed into the machine and discharged from the machine at the same end.

Mounted on the frame 2 adjacent the lower portion thereof is a processing tank 68 adapted to contain a quantity of processing liquid, such as vegetable or mineral oil, which is heated to the proper temperature by any suitable means, such as gas burners 69 arranged below the tank. The conveyor 61 passes under the rollers 71 disposed in the tank 68 so that the eggs carried by the conveyor are submerged in the hot liquid.

The liquid in the tank 68 is hottest at its surface and, in the event that this liquid reaches too high a temperature, means are provided for removing the surface liquid. Connected to the tank 68 adjacent the upper surface of the liquid is a conduit 72 through which the liquid may be withdrawn and forced by the pump 73 through the conduit 74 into the supply tank 75. From the supply tank, the oil may be drawn at desired intervals and in desired quantities and discharged into the tank 68 to maintain the proper level of liquid therein.

Means are provided for heating the eggs before they are submerged in the hot liquid and for subjecting the eggs to a heated atmosphere after they emerge from the hot liquid and before they are cooled. Disposed over the tank 68 and forming a substantially tight joint therewith is a hood 78 through which the conveyor 61 passes before it enters and after it emerges from the tank 68. The hood 78 becomes heated by conduction and radiation from the hot liquid in the tank 68 so that the eggs on the conveyor are heated before they enter the hot liquid, thereby reducing the liability of cracking of the egg shells due to emersion in the hot liquid. Also, when the eggs are removed from the hot liquid they are brought into a heated atmosphere which maintains their temperature until they are submerged in a cooling liquid.

Arranged on the frame below the washing tank 4 is a cooling tank 81 containing processing liquid and through which the conveyor 61 passes. The hood 78 extends over the receiving end of the tank 81 so that the eggs are maintained in a heated atmosphere from the time they leave the hot processing liquid until they are submerged in the cooling liquid, thereby preventing contact of the eggs with the normal atmosphere. In passing through the tank 81 the eggs are cooled and, as they discharge from the tank 81 and the excess oil has dripped therefrom, they are ready for repacking. The conveyor 61 passes over an end sprocket 82 and returns under the tanks 81 and 68 to the other end of the machine. Arranged below the lower run of the conveyor 61 is a drip pan 83 for collecting all liquids which drip from the conveyor. When the cooled processed eggs are discharged from the tank 81, they may be treated with a suitable powder to remove the shine therefrom so that they have the appearance of fresh eggs. This latter treatment however merely affects the appearance of the egg and has no relation to the processing of the egg for the purpose of improving its keeping quality. Since the method of processing eggs by submerging them in a heated processing liquid is well known and since various liquids are used for this purpose, I have not particularly described the processing action nor the processing liquid.

When desired the tank 81 may be employed only as a drip tank and may not contain a liquid in which the eggs are submerged. After leaving the tank 68, the eggs pass over the tank 81, into which any excess processing liquid drips from the eggs and this liquid is collected in the drip tank and is flowed back into the tank 68.

I claim:

1. In a machine of the character described, means for washing eggs, brushes over which the washed eggs are moved to wipe collected water therefrom and means for blowing a current of hot air over the eggs to dry them.

2. In a machine of the character described, a conveyor adapted to carry a tray of eggs, a washing tank through which the conveyor travels, brushes arranged under the conveyor outside of the washing tank to wipe collected water from the eggs, a tunnel through which the conveyor passes and means for passing a current of heated air through the tunnel.

3. In a machine of the character described, a washing tank, a tunnel arranged adjacent the washing tank, means for passing a current of heated air through the tunnel toward the washing tank and an egg conveyor passing through the washing tank and the tunnel.

4. In a machine of the character described, a conveyor adapted to carry a tray of eggs, a washing tank through which the conveyor passes, a tunnel through which the conveyor passes from the washing tank and means for blowing a current of heated air through the tunnel in a direction opposite to the direction of travel of the conveyor.

5. In a machine of the character described, a conveyor adapted to carry a tray of eggs, a washing tank through which the conveyor travels, brushes in said tank arranged above and below the conveyor and adapted to engage the eggs carried thereby, a tunnel through which the conveyor passes from the washing tank and means for blowing a current of heated air through the tunnel.

6. In a machine of the character described, a conveyor adapted to carry a tray of eggs, a washing tank through which the conveyor travels, brushes in said tank arranged above and below the conveyor and adapted to engage the eggs carried thereby, a tunnel through which the conveyor passes from the washing tank, brushes in said tunnel adapted to wipe collected water from the eggs and means for blowing a current of heated air through the tunnel.

7. In a machine of the character described, a conveyor adapted to carry a tray of eggs, a washing tank through which the conveyor travels, brushes arranged in said tank above and below the conveyor and adapted to engage the eggs carried thereby, means for reciprocating said brushes in opposite directions in the direction of travel of the conveyor and means for vertically adjusting the plane of travel of the brushes.

8. In a machine of the character described, a conveyor adapted to carry a tray of eggs, a washing tank through which the conveyor travels, brushes arranged in said tank above and below the conveyor and adapted to engage the eggs carried thereby, means for reciprocating said brushes in opposite directions in the direction of travel of the conveyor and means for vertically adjusting the plane of travel of the lower brush.

9. In a machine of the character described, a conveyor adapted to carry a tray of eggs, a washing tank through which the conveyor travels, brushes arranged in said tank above and below the conveyor and adapted to engage the eggs, and means for reciprocating the two brushes through different distances.

10. In a machine of the character described, a conveyor adapted to carry a tray of eggs, a washing tank through which the conveyor travels, brushes arranged in said tank above and below the conveyor and adapted to engage the eggs, means for reciprocating the upper brush in the direction of travel of the conveyor and means for reciprocating the lower brush through a greater distance in the direction of travel of the conveyor.

11. In a machine of the character described, a conveyor adapted to carry a tray of eggs, a washing tank through which the conveyor travels, brushes arranged in said tank above and below the conveyor and adapted to engage the eggs, and means for oppositely reciprocating the brushes through different distances.

12. In a machine of the character described, a conveyor adapted to carry a tray of eggs, a washing tank through which the conveyor travels, a brush arranged in said tank above the conveyor, a longer brush arranged in said tank below the conveyor, said brushes being arranged to contact with and rotate the eggs and means for oppositely reciprocating the brushes through different distances.

13. In a machine of the character described, a conveyor adapted to carry a tray of eggs, a washing tank through which the conveyor travels, a brush arranged in said tank above the conveyor, a longer brush arranged in said tank below the conveyor, said brushes being arranged to contact with and rotate the eggs, means for oppositely reciprocating the brushes through different distances and means for vertically adjusting the plane of travel of the lower brush.

14. In a machine of the character described, a conveyor adapted to carry a tray of eggs, a washing tank through which the conveyor travels, reciprocating brushes arranged in said tank above and below the conveyor and means for delivering an abrasive material to the brushes.

15. In a machine of the character described, a conveyor adapted to carry a tray of eggs, a washing tank through which the conveyor travels, reciprocating brushes arranged in said tank above and below the conveyor and a hopper for abrasive material arranged above said brushes and adapted to deliver said material thereto.

16. In a machine of the character described, a conveyor adapted to carry a tray of eggs, a washing tank through which the conveyor travels, reciprocating brushes arranged in said tank above and below the conveyor, a hopper for abrasive material arranged above said brushes, a gate controlling the discharge from said hopper and means for operating said gate to permit the discharge of material from the hopper.

17. In a machine of the character described, a conveyor adapted to carry a tray of eggs, a washing tank through which the conveyor travels, reciprocating brushes arranged in said tank above and below the conveyor, a hopper for abrasive material arranged above said brushes, a discharge gate on said hopper and means connecting the discharge gate with one of the brushes whereby the discharge of material from the hopper is controlled by the reciprocation of the bushes.

18. In a machine of the character described, a conveyor adapted to carry a tray of eggs, means for washing the eggs while carried by said conveyor and a hot air jacketed tunnel through which the eggs are carried by the conveyor after leaving the washing means.

19. In a machine of the character described a tank adapted to contain liquid, an endless conveyor passing through said tank, cross members on said conveyor, an egg tray, hooks on one end of the tray adapted to engage one of said cross members and a projection on the other end of the tray adapted to rest on another cross member.

20. In a machine of the character described, means for carrying an egg through the machine and means for subjecting the egg during its travel to washing, means for drying and means for processing successively.

21. In a machine of the character described, an egg washing apparatus, an egg drying apparatus, a tank adapted to contain an egg processing liquid and means for conveying an egg successively through the washing apparatus, the drying apparatus and the tank.

22. In a machine of the character described, an egg washing apparatus, a tank adapted to contain an egg processing liquid and means for conveying an egg successively through the washing apparatus and said tank.

23. In a machine of the character described, an egg washing apparatus, an egg processing apparatus arranged below the egg washing apparatus, a conveyor passing through the washing apparatus, a conveyor passing in the opposite direction through the processing apparatus and means for transferring the egg from the upper conveyor to the lower conveyor.

24. In a machine of the character described, an egg washing apparatus, an egg drying apparatus, an egg processing apparatus disposed below said washing and drying apparatus, a conveyor passing through said washing and drying apparatus, a conveyor passing in the opposite direction through the processing apparatus and means for transferring the egg from the first conveyor to the second conveyor.

25. In a machine of the character described, an egg washing apparatus, an egg processing apparatus, a conveyor passing through the washing apparatus, a conveyor passing through the processing apparatus, an egg tray adapted to be carried by said conveyors and means for transferring the tray from the first conveyor to the second conveyor.

26. In a machine of the character described, a frame, an egg washing tank arranged on said frame, a tunnel, means for blowing a current of heated air through the tunnel, a conveyor passing through said tank and tunnel and adapted to carry an egg tray, an oil tank arranged on the frame below the tunnel, means for heating the oil in said tank, a conveyor passing through the oil tank and means for transferring an egg tray from the first conveyor to the second conveyor.

27. In a machine of the character described, an egg washing apparatus, an egg drying apparatus, a tank adapted to contain a hot processing liquid and a tank adapted to contain a cold processing liquid and means for conveying an egg successively through the said several apparatus and tanks in the order named.

28. In a machine of the character described, a tank adapted to contain a processing liquid, means for heating said liquid, a hood arranged over said tank adapted to contain air heated by the hot liquid and an egg conveyor passing under said hood and through said tank.

29. In a machine of the character described, a tank adapted to contain a processing liquid, means for heating said liquid, a second tank adapted to contain a cold processing liquid and an egg conveyor passing successively through said tanks.

30. In a machine of the character described, a tank adapted to contain a processing liquid, means for heating said liquid, a second tank adapted to contain cold processing liquid, an egg conveyor passing successively through said tanks and a hood covering the first tank and extending partly over the second tank.

In testimony whereof, I have hereunto set my hand.

CHARLES McCULLOUGH.